United States Patent [19]
Yuen et al.

[11] Patent Number: 5,903,868
[45] Date of Patent: May 11, 1999

[54] AUDIO RECORDER WITH RETROACTIVE STORAGE

[76] Inventors: Henry C. Yuen; Philip P. Yuen, both of P.O. Box 1159, Redondo Beach, Calif. 90278

[21] Appl. No.: 08/600,495

[22] Filed: Feb. 13, 1996

Related U.S. Application Data

[60] Provisional application No. 60/007,467, Nov. 22, 1995.

[51] Int. Cl.$^6$ ...................................................... G10L 3/00
[52] U.S. Cl. .......................... 704/270; 704/275; 704/201
[58] Field of Search .................................... 395/2.1, 2.09, 395/2.67, 2.4; 361/15, 18, 64; 369/32, 47; 704/201, 200, 231, 258, 270, 272, 274, 275

[56] References Cited

U.S. PATENT DOCUMENTS

| | | | |
|---|---|---|---|
| 4,449,232 | 5/1984 | Hashimoto et al. | 381/51 |
| 4,548,511 | 10/1985 | Yabe | 368/10 |
| 4,677,657 | 6/1987 | Nagata et al. | 379/63 |
| 4,717,261 | 1/1988 | Kita et al. | 368/63 |
| 4,791,741 | 12/1988 | Kondo | 40/124.1 |
| 4,851,931 | 7/1989 | Parker et al. | 360/15 |
| 4,926,484 | 5/1990 | Nakano | 381/56 |
| 4,996,607 | 2/1991 | Kashida et al. | 360/18 |
| 5,123,538 | 6/1992 | Groenewegen | 206/521 |
| 5,129,036 | 7/1992 | Dean et al. | 395/2.09 |
| 5,161,199 | 11/1992 | David | 381/51 |
| 5,257,142 | 10/1993 | Hong | 360/33.1 |
| 5,313,556 | 5/1994 | Parra | 395/2.55 |
| 5,313,557 | 5/1994 | Osterhout | 395/2.81 |
| 5,343,452 | 8/1994 | Maeda et al. | 369/32 |
| 5,357,595 | 10/1994 | Sudoh et al. | 395/2.24 |
| 5,359,698 | 10/1994 | Goldberg et al. | 395/2.1 |
| 5,440,529 | 8/1995 | Takezawa et al. | 369/13 |
| 5,481,414 | 1/1996 | Takada et al. | 360/64 |
| 5,539,741 | 7/1996 | Barraclough et al. | 370/267 |
| 5,587,978 | 12/1996 | Endo et al. | 369/32 |
| 5,590,252 | 12/1996 | Silverbrook | 345/433 |
| 5,619,483 | 4/1997 | Yokota et al. | 369/47 |
| 5,687,279 | 11/1997 | Matthews | 704/201 |

OTHER PUBLICATIONS

Kimura et al, "Development of an IC–card speech recorder," Sharp Technical Journal, No. 55, pp. 39–42, Mar. 1993.

Sugiyama et al, "The silicon audio an audio–data compression and storage system with a semiconductor memory," IEEE Transactions on Consumer Electronics, vol. 41, iss. 1, pp. 186–194, Feb. 1995.

Sakai, "Burst multiplexing method of multimedia signals by communication terminal," Electronics and communications in Japan, Part 1, vol. 73, No. 2, pp. 53–63, Feb. 1990.

*Primary Examiner*—Richemond Dorvil
*Attorney, Agent, or Firm*—Gifford, Krass, Groh, Sprinkle, Anderson & Citkowski, PC

[57] ABSTRACT

An audio recorder with retroactive storage capability operates under control of a sound responsive switch to enter signals representative of the instantaneous amplitude of sound signals received by a microphone into a first-in first-out memory. When the memory is filled, digital signals representative of newly recorded sound supplant the oldest signals in the memory. An operator listening to the sound may retroactively capture signals representative of the most recently occurring sounds against erasure by depressing a pushbutton. Circuitry responsive to the resulting signal removes the most recently generated sound signals from the first-in first-out queue so that they may be later recalled to reproduce the sounds.

20 Claims, 2 Drawing Sheets

5,903,868

AUDIO RECORDER WITH RETROACTIVE STORAGE

This application claims the benefit of U.S. Provisional Application No. 60/007,467 filed Nov. 22, 1995.

FIELD OF THE INVENTION

This invention relates to audio recorders in general and more particularly to a device which records audio signals in a first-in first-out memory queue and allows the operator to designate previously recorded sections for preservation and later playback, independent of the operation of the queue.

BACKGROUND OF THE INVENTION

Audio recorders for use in conferences, business meetings and the like have evolved in recent years from relatively large, heavy devices using motor driven magnetic tapes to lightweight portable units which may be hand held and are powered by small batteries. Recently, solid state memories employing integrated circuits have supplanted tape recorders in many applications resulting in even smaller and lighter-weight units.

These integrated circuit recorders may record analog values representing the instantaneous amplitude of the sound reaching the unit's microphone or the microphone output may be digitized and stored as binary values. Digital compression/decompression circuits may be employed to increase storage capacity for a fixed memory size. Often these recorders employ sound responsive switches to reduce the battery drain when there are no sounds to be recorded.

These recorders may operate on a first-in first-out basis so that the recorder stores the most recently captured sounds and discards signals or overwrites representative of the oldest sounds so that the memory capacity is not exceeded. For example, if a memory has a capacity for storing ten minutes of sound, when the memory is full the system continues to record the most recently generated sounds at the expense of signals stored in the recorder representing the oldest sounds so that at any time the most recently recorded ten minutes of sounds are stored.

In certain recording situations most of the sounds being recorded, be they voice or music or the like, need not be preserved, but from time-to-time sounds will be generated that the operator of the recorder desires to preserve and later play back and possibly transcribe. For example, in a business meeting, court proceeding, musical rehearsal or the like there may be no need to record the entire proceedings, but occasionally a statement is made or a musical section is played that the operator, after hearing the sounds, deems it important to preserve. The present invention is directed towards such usages.

SUMMARY OF THE INVENTION

The present invention takes the form of an audio recorder including a microphone and a sound responsive switch which receives and analyzes microphone output on a continuous basis when the device is energized. When the sound responsive switch detects signals representative of speech or music, the microphone output is provided to an audio memory on a first-in first-out, queuing basis. That is, when the memory is full the oldest signals are discarded or erased to make room for the most recently generated signals to be stored. The recorder includes an operator controlled momentary contact switch which may be actuated when the operator desires that a statement just made or musical passage just played should be captured for later replay. Actuation of the switch removes signals recorded during the last predetermined time period, such as ten seconds, from the first-in first-out queue so that these signals are preserved independently of later additions to the queue which would otherwise cause these preserved signals to be emptied or erased. The audio memory preferably has a capacity for storage of a limited number of these preserved signals so that the operator may actuate the capture button a number of times and each time store signals representative of the immediately proceeding sounds so as to preserve them from erasure during the first-in first-out operation.

Given the small size, light weight, and low battery drain of audio recorders formed in accordance with the present invention, they may take the form of a button adapted to be worn on clothing, or a wrist worn device or may be incorporated into a conventional wristwatch. The capture button, which is actuated by the operator when it is desired to preserve the immediately preceding sound section, may be located remotely from the recorder and communicate with the recorder via electromagnetic signals such as infrared.

In a preferred embodiment of the invention, which will be subsequently disclosed in detail, the signals received from the microphone are stored under control of the sound responsive switch in adjacent sections of an integrated circuit memory under the control of a memory address counter. When the capture switch is actuated, the section of the memory storing the most recently recorded signals is identified and is removed from the first-in first-out queue. In this manner, each time the capture switch is activated the queue is shortened in length. In a system in which five minutes of sounds may be recorded and signals representative of the previous ten seconds are preserved each time the operator actuates the capture button, the queue length is reduced by ten seconds each time a section is captured. Thus, a total of 30 ten second segments may be preserved. When 29 have been preserved, the queue length is only ten seconds long. The preferred embodiment of the invention includes a register storing the time length of a captured sound section. The recorder is provided with controls which allow the operator to adjust the time length of a captured section.

The audio recorder may include a digital clock which generates signals stored each time the operator actuates the capture switch so that on playback the date and time that the captured section is recorded are identified by audio signals. In an embodiment of the invention in which the recorder is built into a wristwatch, the digital signals may be derived from the clock portion of the device.

The operator controls further include a display assigning consecutive identifying numbers to each preserved segment and a keyboard which allows an operator to input a segment number for replay. The display also provides the operator with a signal indicating the remaining length of the queue.

In an alternate embodiment of the invention the queue length is constant and the signals in the queue are shifted by one memory location each time a new signal is entered. When the operator depresses the "preserve" switch, the most recently stored signals are transferred to nonvolatile memory locations which are independent of the queue. The memory section forming the queue may be formed of volatile solid-state memory.

The audio memory may constitute a digital tape or a multi-cell integrated circuit which stores the recorded signals in either digital or analog form. If the storage is in digital form an analog-digital converter is provided to convert the microphone output into digital signals and a digital-analog converter processes the memory output into appropriate form during replay. A compression/decompression circuit may be used to extend the storage time for a memory of given capacity.

DESCRIPTION OF THE DRAWINGS

Other objects, advantages and applications of the present invention will be made apparent by the following detailed description of several embodiments of the invention. The description makes reference to the accompanying drawings in which.

DETAILED DESCRIPTION OF THE PREFERRED EMBODIMENT

Figure 1:
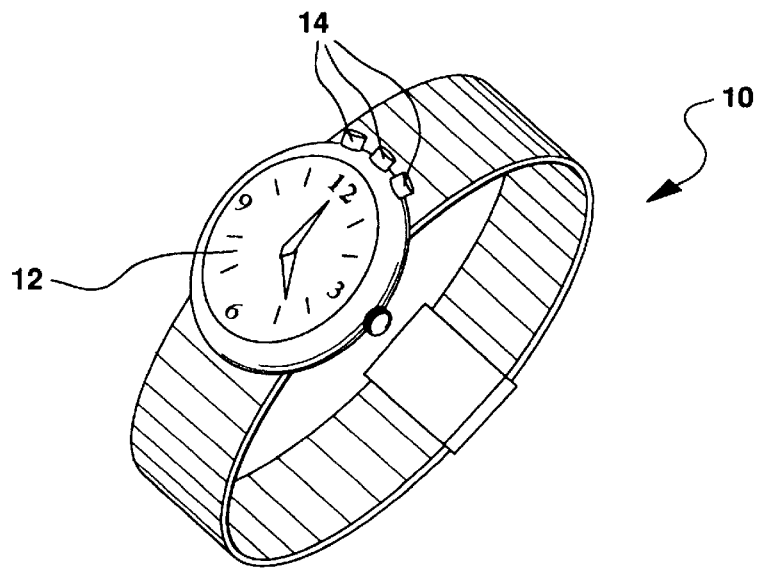
FIG. 1 is a perspective view of a wrist worn device incorporating the audio recorder of the present invention and a conventional watch.

Audio recorders formed in accordance with the present invention may easily be miniaturized because of their use of low power solid state circuitry. FIG. 1 illustrates a wrist unit, generally indicated at 10, incorporating a conventional clock 12 and push buttons 14 which the operator may use to control a built in audio recorder with retroactive storage.

Figure 2:
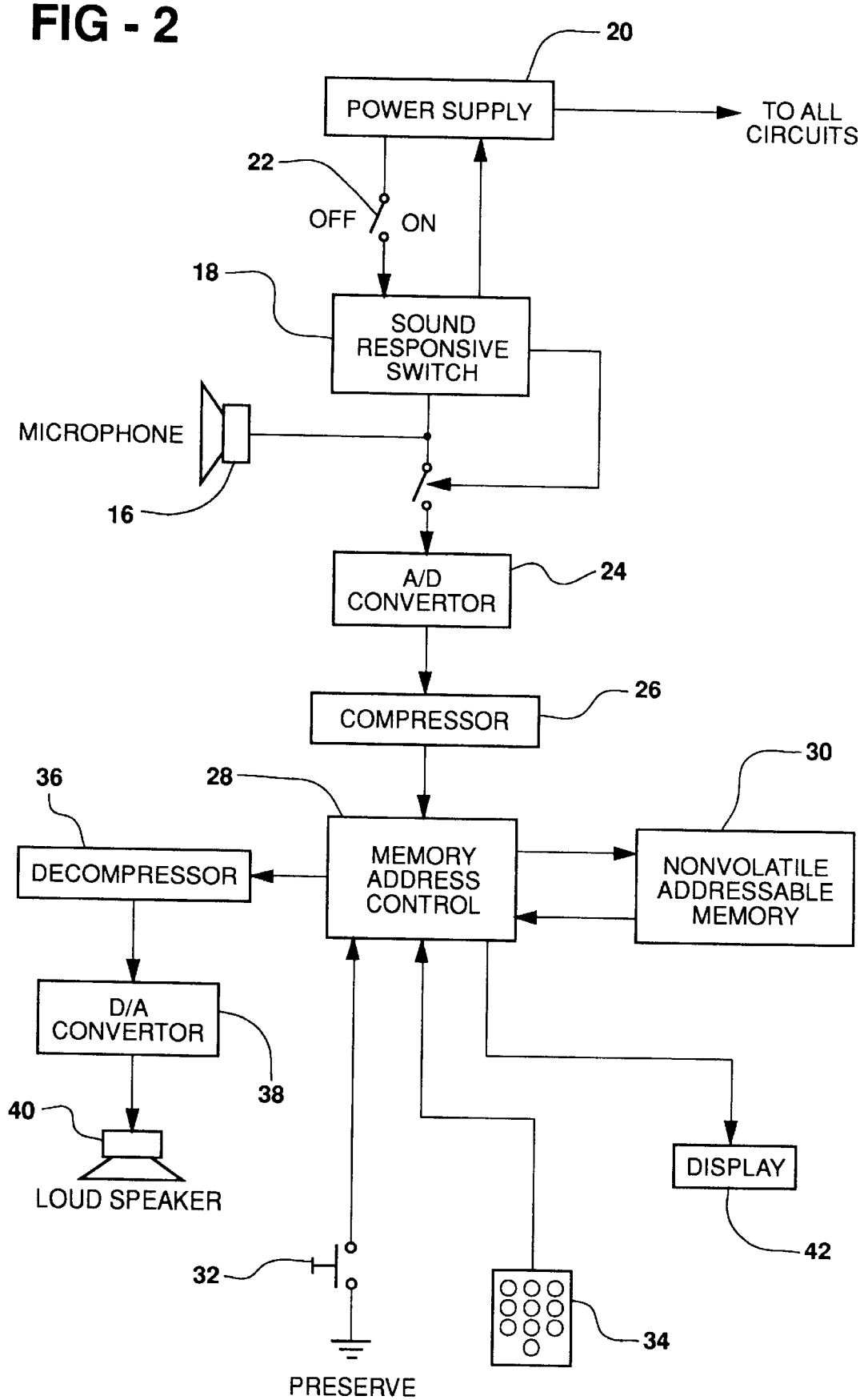
FIG. 2 is a schematic diagram of a preferred embodiment of the invention employing an addressable digital memory to store both the signals in the memory queue and the signals designated by the operator to be captured from the queue for later review and reply.

Referring to FIG. 2, a preferred embodiment of the present invention employs a miniature microphone 16 which picks up ambient sound and provides an output analog signal having an instantaneous value representative of the amplitude of the sound. The microphone output signal is provided to a sound responsive switch 18 of conventional design. By way of example, U.S. Pat. No. 4,926,484 discloses such a switch for determining whether an input audio signal is a speech or nonspeech signal. When a speech signal is detected a signal is sent by the sound responsive switch to a power supply 20, preferably constituting a battery, such as an electric watch battery, which then energizes all of the associated circuitry during the duration of the speech signal. In the absence of a speech signal only the sound responsive switch 18 is energized. An operator controlled on/off switch 22 allows the entire system, including the sound responsive switch to be deactivated. An optional operator controlled switch may allow the system to be on at all times, but use of the sound responsive switch greatly reduces the power consumption of the system.

When the operator-controlled record switch is on, or when the sound responsive switch detects a speech signal (or a music signal if it is appropriately designed), the output of the microphone 16 is provided to an analog-to-digital converter which samples the amplitude of the input signal and generates a series of digital signals representing the instantaneous amplitude of the microphone output. These digital signals are preferably provided to a compressor 26 which utilizes any of the variety of commercially available compression algorithms to provide an output signal containing fewer bits than the input, from which the input can be substantially reconstructed. The compressed output from the unit 26 is provided to a memory address control circuit 28 which channels the compressed audio signal to an appropriate location in a non-volatile addressable memory 30. The memory 30 may be of the flash variety. The memory may take the form of a circular stack with a pointer which is automatically moved to the point at which new recording should begin.

The memory address control 28 acts to feed successive bits of the compressed digital signal to consecutive memory addresses. The length of the nonvolatile memory 30 will depend on economic considerations but a preferred embodiment may store 2–30 minutes of compressed audio. When the capacity of the memory 30 has been reached the memory address control will operate to feed newly arriving signals into the memory locations containing the oldest signals stored in the memory, writing over the old signals. Initially, the entire nonvolatile memory 30 is devoted to recording this queue of newly arriving sounds.

The operator of the audio recorder will be listening to the same sounds that are received by the microphone 16. When the operator hears a section of sound that is deemed worthy of preservation, the operator actuates a preserve pushbutton 32. In the preferred embodiment, the pushbutton is permanently connected to the audio recorder, but, in alternative embodiments the pushbutton 32 could be located remotely and could communicate with the balance of the audio recorder circuitry via a suitable electromagnetic link such as infrared or RF. The remotely located preserve switch would be equipped with an appropriate electromagnetic transmitter and the balance of the circuitry would be equipped with an electromagnetic receiver operative to receive signals from the remote transmitter and provide them to the memory address control 28.

Each time the operator actuates the preserve switch 32 a section of the most recently stored signals in the preserve memory are removed from the memory queue. For example, the system may be programmed so that each time the preserve switch 32 is actuated, the last ten seconds of recorded sound is captured. This can be done by comparing the pointer location to see if it is protected and jump over the protected ones. The memory address control achieves this capture by simply routing the digital signals from the compressor 26 into the locations 30 of the memory in such a way as to avoid overwriting the section that has been captured. For simplification purposes assume that the memory 30 has ten locations. Initially the signals from the compressor 26 are routed sequentially to locations 1–10. After the memory is filled, the next signal is written into location 1, overwriting the signal representing the oldest sound in the memory. Thus the queue length is locations 1–10. If the preserve pushbutton 2 captures the sound in one section of the memory, the first time it is actuated the queue length is reduced by one memory section so that it is nine sections long. The section which is removed from the queue, so that it will not be subsequently overwritten, is the memory section filled just before the preserve pushbutton 32 was actuated. The next time the preserve switch 32 is actuated another memory section will be deleted from the queue. A total of ten sections could be preserved in this manner.

In an alternative embodiment, the signals from the compressor 26 could always be entered into the same memory section, and each time a signal is added the contents of each memory section could be shifted to the subsequent memory section. When the memory queue is full in this alternative embodiment, the signals from the last section in the queue are simply discarded each time a new signal is introduced at the beginning of the queue. In this alternative embodiment the memory sections which are captured are always contiguous to one another.

Returning to the description of the system of FIG. 2, each time a memory section is captured for a later playback, the memory address control 32 writes an identifying address at the beginning of the captured memory section. The captured memory sections are provided with sequential identifying numbers. Any captured section can be replayed under appropriate signals entered into the memory address control by the operator using a keypad 34. By using the keypad 34 to identify a captured memory section and hitting a playback button associated with the keypad 34, the operator causes the captured memory section to be read out to a decompressor circuit 36 which feeds a digital-to-analog converter 38 to convert the digits back into an audio signal, and play back the captured signalusing loud speaker 40.

Like digital recorders on the market, the keypad 34 allows the operator to switch from segment to segment on a consecutive basis by actuating a button. A display 42 connected to the memory address control displays the number associated with each captured sound section so that the operator can replay a particular section. Alternatively, the display may show the date/time or a message number and the user may select a message for playback using the keypad or a voice responsive device.

The memory address control preferably includes circuitry or a program allowing the operator to adjust the length of the sound section which is captured each time the preserve button 32 is actuated. In some situations it may be desirable for the operator to capture a relatively small number of long segments or alternatively a relatively large number of short segments.

Through use of the keypad 34 the operator can also delete any captured section so as to effectively restore that section to the queue.

Figure 3:
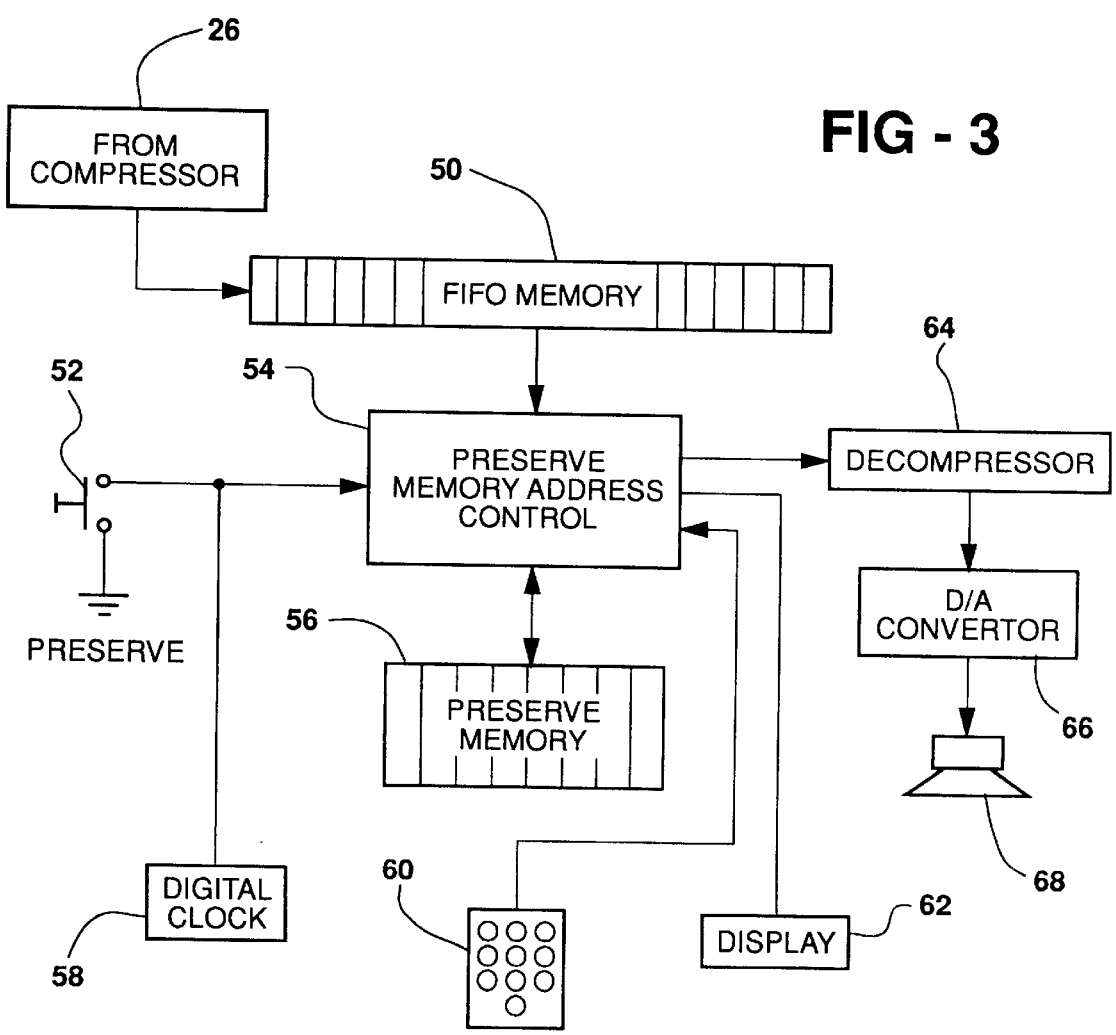
FIG. 3 is a schematic diagram of a second embodiment of the invention in which the memory queue and the captured signals are stored in independent memory sections.

An alternative embodiment of the storage section of the present invention is illustrated in FIG. 3. The circuitry of the two are identical through the digital compressor 26. The compressed signals in the embodiment of FIG. 3 are provided to a first-in first-out shift memory 50 which may be volatile, so that its contents are not preserved when this switch 22 is turned to the off position. The compressed signals are fed into an initial section of the memory and each time a compressed signal is added to the memory all of the memory contents are shifted one section toward the opposite end. When the memory fills the contents of the last section, representing the oldest sounds, are discarded. When the operator hears a section of the sound that is deemed worthy of capture a preserve pushbutton 52 is actuated sending a signal to a preserve memory address control unit 54. The control unit 54 transfers an initial section of the contents of the first-in first-out memory 50, representing the most recently recorded sounds, to a nonvolatile preserve memory 56. The section transferred from the FIFO memory may constitute the entire contents of the FIFO memory, or alternatively, only a partial section thereof. In the latter case, by again actuating the preserve button 52, the operator may cause the transfer of a second section of the FIFO memory, storing older occurring sounds, into another section of the preserve memory 56. For example, the FIFO memory may store 30 seconds of sound and each time the preserve switch 52 is actuated ten seconds of sound may be transferred to the nonvolatile memory 56. Thus, by actuating the preserved switch three times in sequence, the last 30 seconds could be preserved.

Each time a section of the FIFO memory is transferred to the preserve memory 56, additional signals, representing the output of a digital clock 58, are recorded with the captured sounds. On playback these digital signals will be converted to audio signals indicating the date and time that the capture occurred.

Through use of a keyboard 60 and a display 62, the operator can call up any segment captured in the preserve memory 56 for replay through a decompressor 64 which feeds a digital-to-analog converter 66 and provides output to a loudspeaker 68. The keyboard 60 and display 62 may also be used to adjust the length of a captured section or to sequence the output between adjacent captured sections. The display 62 will also indicate the number of preserve memory sections still available. For example, if a total of 20 memory sections can be stored, the display will decrement by one number each time an additional section is captured for preservation.

As an alternative to storing the signals in digital form, they may be stored in analog form using EEPROM semiconductor storage devices of the type manufactured by Information Storage Devices, Inc. of San Jose, Calif., and described in their Application Notes and Design Menu dated March 1992. These memories provide high density nonvolatile storage without the need for A/D or D/A conversion.

Having disclosed our invention, we claim:

1. An audio recorder, comprising, in combination:

a microphone;

an audio signal memory having a plurality of signal storage locations;

circuitry for storing signals representative of the instantaneous output of the microphone in the memory in a queue served on a first-in first-out basis;

an operator controlled switch connected to said circuitry for storing signals representative of the output of the microphone in the memory, said switch being operative to capture signals stored in the queue during a period of time previous to the actuation of the operator controlled switch so as to preserve said captured signals independently of the operation of said memory queue;

said circuitry for storing signals representative of the output of the microphone in the memory including memory addressing means for updating the memory address each time a signal is stored in memory so that consecutive signals from the microphone are stored at different memory locations which constitute said queue, and said operator controlled switch causing said memory addressing means to bypass the section of the memory containing said signals to be captured from the first-in first-out queue; and means under operator control for generating an audio output based on said captured signals.

2. The audio recorder of claim 1, further including analog-to-digital conversion means for converting the output of the microphone into digital signals for provision to said audio signal memory, and digital-to-analog conversion means for converting said captured signals into audio signals for playback.

3. The audio recorder of claim 2 further including digital compression means operative to receive the output of said analog-to-digital converter and providing output of compressed signals to said audio signal memory and decompression means connected to receive said captured signals and providing output to said digital-to-analog conversion means.

4. The audio recorder of claim 1 in which said circuitry for storing signals representative of the output of the microphone in the audio signal memory includes means for providing such signals to a single memory storage location and advancing each signal stored in the memory to a consecutive storage location each time a signal is stored so that the consecutive memory storage locations constitute said queue.

5. The audio recorder of claim 1 in which the audio signal memory stores the output signals from the microphone in said signal storage locations as analog values.

6. The audio recorder of claim 1 including straps for securing the audio recorder to the wrist of a wearer.

7. The audio recorder of claim 6 including a clock with a time display supported by said straps.

8. The audio recorder of claim 1 in which said operator controlled switch is supported independently of the balance of the audio recorder and further including an electromagnetic transmitter physically associated with the switch and an electromagnetic receiver associated with the balance of the audio recorder so that the operation of the audio recorder may be controlled remotely.

9. The audio recorder of claim 1, further including a sound responsive switch adapted to receive the output of said microphone, and wherein the activation of said circuitry is controlled by said sound responsive switch.

10. A method of storing audio information, comprising the steps of:

receiving audio information into a first-in, first out buffer of a fixed length, the operation of said buffer being characterized in that once the buffer is filled, the oldest information is discarded as new information is received;

receiving an operator command;

preserving only the audio information contained within the buffer for a predetermined period of time immediately prior to receiving said command, thereby preventing the preserved information from being discarded through the operation of said buffer while continuing to receive new audio information into the first-in, first-out buffer, such that the oldest non-preserved information is discarded as the new information is received; and recalling said preserved information.

11. The method of claim 10, wherein said preserved information remains in the buffer, and wherein the method further includes the step of reducing the length of said buffer by an amount equal to said predetermined period of time.

12. The method of claim 10, further including the steps of:

providing a memory separate from said buffer; and storing the preserved audio information in said memory in response to the operator command.

13. The method of claim 10, wherein the step of receiving audio information into a first-in, first-out buffer of a fixed length includes the step of receiving said audio information in digital form.

14. The method of claim 10, wherein the step of receiving audio information into a first-in, first-out buffer of a fixed length includes the step of receiving said audio information in analog form.

15. An audio recorder, comprising, in combination:

a microphone;

a first audio signal memory having a plurality of signal storage locations;

circuitry for storing signals representative of the instantaneous output of the microphone in said first memory in a queue served on a first-in first-out basis;

a second audio signal memory constituting nonvolatile storage outside of the first-in first-out queue, said audio signal memory comprising a magnetic tape, record and playback heads, and means for moving said tape relative to said record and playback heads;

an operator controlled switch connected to said circuitry for storing signals representative of the output of the microphone in said first memory, said switch being operative to capture signals stored in said queue during a period of time previous to the actuation of the operator controlled switch, thereby preserving said captured signals independently of the operation of said memory queue in said second audio signal memory; and means under operator control for generating an audio output based upon said captured signals.

16. The audio recorder of claim 15, further including analog-to-digital conversion means for converting the output of the microphone into digital signals for provision to said audio signal memory, and digital-to-analog conversion means for converting said captured signals into audio signals for playback.

17. The audio recorder of claim 15, further including digital compression means operative to receive the output of said analog-to-digital converter and providing output of compressed signals to said audio signal memory and decompression means connected to receive said captured signals and providing output to said digital-to-analog conversion means.

18. The audio recorder of claim 15, in which the audio signal memory stores the output signals from the microphone in said signal storage locations as analog values.

19. The audio recorder of claim 15, in which said operator controlled switch is supported independently of the balance of the audio recorder, and further including an electromagnetic transmitter physically associated with the switch and an electromagnetic receiver associated with the balance of the audio recorder so that the operation of the audio recorder may be controlled remotely.

20. The audio recorder of claim 15, further including a sound responsive switch adapted to receive the output of said microphone, and wherein the activation of said circuitry is controlled by said sound responsive switch.

* * * * *